United States Patent [19]
Hsich et al.

[11] Patent Number: 6,012,496
[45] Date of Patent: Jan. 11, 2000

[54] MULTI-LAYER TUBING ASSEMBLY FOR FLUID AND VAPOR HANDLING SYSTEMS

[75] Inventors: Henry S. Hsich, Rochester Hills, Mich.; Dean T. Su, Princeton Junction, N.J.

[73] Assignee: Hybritech Polymers, Mercerville, N.J.

[21] Appl. No.: 09/314,810

[22] Filed: May 19, 1999

Related U.S. Application Data

[63] Continuation-in-part of application No. 08/593,068, Jan. 29, 1996.

[51] Int. Cl.$^7$ ...................................................... F16L 11/08
[52] U.S. Cl. ........................... 138/137; 138/140; 138/141; 138/DIG. 1
[58] Field of Search ..................................... 138/137, 140, 138/141, DIG. 1

[56] References Cited

U.S. PATENT DOCUMENTS

| | | | |
|---|---|---|---|
| 3,070,132 | 12/1962 | Sheridan | 138/103 |
| 3,166,688 | 1/1965 | Rowand et al. | 138/103 X |
| 3,473,087 | 10/1969 | Slade | 138/103 |
| 3,561,493 | 2/1971 | Maillard | 138/141 |
| 3,907,955 | 9/1975 | Viennot | 264/165 |
| 4,643,927 | 2/1987 | Luecke et al. | 428/36 |
| 4,706,713 | 11/1987 | Sadamitsu et al. | 138/137 |
| 4,887,647 | 12/1989 | Igarashi et al. | 138/126 |
| 5,038,833 | 8/1991 | Brunnhofer | 138/137 |
| 5,076,329 | 12/1991 | Brunnhofer | 138/137 |
| 5,142,782 | 9/1992 | Martucci | 138/125 X |
| 5,170,011 | 12/1992 | Martucci | 138/184 |
| 5,284,184 | 2/1994 | Noone et al. | 138/121 |
| 5,383,087 | 1/1995 | Noone et al. | 138/137 |
| 5,419,374 | 5/1995 | Nawrot et al. | 138/137 |
| 5,460,771 | 10/1995 | Mitchell et al. | 264/508 |
| 5,469,892 | 11/1995 | Noone et al. | 138/121 |
| 5,524,673 | 6/1996 | Noone et al. | 138/137 X |
| 5,554,425 | 9/1996 | Krause et al. | 138/137 X |
| 5,566,720 | 10/1996 | Cheney et al. | 138/137 |
| 5,653,266 | 8/1997 | Reynolds | 138/137 |

FOREIGN PATENT DOCUMENTS

| | | |
|---|---|---|
| 0551094 | 7/1993 | European Pat. Off. . |
| WO 9321466 | 10/1993 | WIPO . |
| WO 9325835 | 12/1993 | WIPO . |
| WO 9409303 | 4/1994 | WIPO . |
| WO 9523036 | 8/1995 | WIPO . |

OTHER PUBLICATIONS

Henry S. Hsich, "Morphology and Property Control via Phase Separation or Phase Dissolution During Cure in Multiphase Systems", pp. 186–203, 1990, Advances in Polymer Technology, vol. 10, No. 3.

*Primary Examiner*—Patrick Brinson
*Attorney, Agent, or Firm*—Dorn, McEachran, Jambor & Keating

[57] ABSTRACT

A multi-layer tubing for use in fluid transport applications. The tubing is suitable for conveying fluids containing hydrocarbons. The tubing comprising an extrudable adhesive layer coextruded around a permeation-resistant layer of fluoropolymer and a layer of polymer chemically dissimilar from fluoropolymer coextruded around the adhesive . The adhesive layer is formed of a polymer blend or alloy having a multi-phase morphology wherein one phase is miscible with the fluoropolymer for forming the inner permeation-resistant layer and another phase is miscible with the polymer chemically dissimilar from fluoropolymer.

To achieve sufficient bonding, the adhesive layer comprises at least 25% volume fraction of the first phase which is miscible with the fluoropolymer for forming inner permeation-resistant layer and at least 25% volume fraction of the second phase which is miscible with the polymer chemically dissimilar from fluoropolymer.

Furthermore, the adhesive layer of polymer blends or alloys having a multi-phase morphology can be modified by adding compatibilizers and rheology modifiers to improve adhesion strength and to allow the material for forming the adhesive layer to obtain proper viscosity and elasticity for extrusion.

26 Claims, No Drawings

MULTI-LAYER TUBING ASSEMBLY FOR FLUID AND VAPOR HANDLING SYSTEMS

This application is a continuation-in-part of copending application Ser. No. 08/593,068, filed on Jan. 29, 1996.

BACKGROUND OF THE INVENTION

The present invention relates to multi-layer tubing for fluid and vapor handling systems. More specifically, it relates to coextruded multi-layer tubing assemblies for use in automotive fuel line applications having one or more inner layers of fluoropolymer, a middle adhesive layer and an outer layer of polymer which is chemically dissimilar from fluoropolymer.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, engine temperatures often rise to extremely high levels, and in cold climates, there is exposure to extremely low temperatures as well.

This abundance of considerations has led to design of tubing having multiple layers. The materials of each layer have specific, and preferably complementary properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses tubing having two coextruded layers of different plastics, and a coextruded layer of adhesive therebetween. The layers are chosen from plastics having complementary properties. U.S. Pat. No. 4,643,927 to Luecke et al. discloses tubing having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows multi-layer tubing having an inner fluororubber layer that prevents degradation due to amine-type additives and also exhibits improved adhesion to an outside rubber layer. U.S. Pat. No. 5,038,833 to Brunnhofer discloses tubing having a protective outer polyamide layer, a middle alcohol barrier layer of polyvinylalcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. Nos. 3,166,688 to Rowand et al. and 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multi-layer tubing assemblies have usually included at least one permeation-resistant fluoropolymer layer. Difficulties have been encountered, however, in finding a commercially viable design. Most fluoropolymers having strong mechanical properties, for example, do not bond well with other fluoropolymers. Conversely, fluoropolymers exhibiting good bondability (polyvinylidene fluoride (PVDF), in particular) tend to be mechanically weak.

U.S. Pat. No. 5,383,087 to Noone et al. is a recent example. It includes an outer impact-resistant polyamide layer, an intermediate bonding layer, an inner permeation-resistant fluoroplastic layer, and an innermost conductive fluoroplastic layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose multi-layer coextruded tubing having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact-resistance. This is due to the fact that PVDF becomes brittle at low temperatures.

Other high performance fluoropolymers, such as ethylene tetrafluoroethylene (ETFE), exhibit better cold impact-resistance but again, have experienced bonding problems. One approach in the art has been to pretreat the ETFE surface using methods such as chemical etching, plasma discharge or corona discharge. European Patent Application publication no. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermosetting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can be environmentally hazardous. Furthermore, in many cases (such as with corona treatment), only temporary bonding is achieved and delamination may occur with aging.

SUMMARY OF THE INVENTION

The present invention provides a coextruded multi-layer tubing assembly having an extruded inner permeation-resistant layer of fluoropolymer, an adhesive layer coextruded around the inner layer and outer layer of polymer chemically dissimilar from fluoropolymer coextruded around the adhesive layer. The adhesive layer is formed of a polymer blend or alloy having a multi-phase morphology wherein one phase is miscible with the fluoropolymer for forming the inner permeation-resistant layer and another phase is miscible with the polymer chemically dissimilar from fluoropolymer for forming the outer layer.

To achieve sufficient bonding, the adhesive layer comprises at least 25% volume fraction of the first phase which is miscible with the fluoropolymer for forming the inner permeation-resistant layer and at least 25% volume fraction of the second phase which is miscible with the polymer chemically dissimilar from fluoropolymer for forming the outer layer.

Furthermore, the adhesive layer of polymer blends or alloys having a multi-phase morphology may be modified by adding compatibilizers and rheology modifiers to improve adhesion strength and to allow the material for forming the adhesive layer to obtain proper viscosity and elasticity for extrusion.

DETAILED DESCRIPTION OF THE PREFERRED EMBODIMENTS

The present invention provides a coextruded multi-layer tubing assembly having an inner permeation-resistant layer of fluoropolymer, a middle adhesive layer and an outer layer of polymer chemically dissimilar from fluoropolymer. The adhesive layer is formed of a polymer blend or alloy having a multi-phase morphology wherein one phase is miscible the fluoropolymer for forming the inner permeation resistant layer and another phase is miscible with the polymer chemically dissimilar from fluoropolymer for forming the outer layer. The tubing may also have an innermost semi-conductive layer of fluoropolymer with a surface resistivity in the range of about $10^2$ to $10^8$ ohm/sq. A semi-conductive layer, rather than a highly conductive layer, provides better mechanical properties and is more suitable for coextrusion.

A first embodiment of the present invention is a four-layer tubing assembly for use in liquid fuel-line applications. It includes an extruded innermost semi-conductive layer of ethylene tetrafluoroethylene (ETFE). The ETFE is made semi-conductive by mixing it with 1% to 10% by weight of conductive carbon black. It has a surface resistivity in the range of about $10^2$ to $10^8$ ohm/sq., with a preferential range of $10^2$ to $10^5$ ohm/sq. An inner permeation-resistant layer of ETFE is coextruded around the innermost layer of semi-conductive layer of ETFE.

An adhesive layer is coextruded around the inner permeation-resistant layer. The adhesive is a polymer blend or alloy that has a multi-phase morphology wherein one phase is compatible or miscible with ETFE, and another phase is compatible or miscible with polyamide. Morphology development and mechanisms of phase separation in polymer alloys and blends is known and is described in the inventor's prior art publication, "Morphology and Property Control via Phase Separation or Phase Dissolution during Cure in Multiphase Systems", Advances in Polymer Technology, Vol. 10, No. 3, pp. 185–203 (1990). Use of an adhesive of polymer blends and alloys having multi-phase morphology is also described in the inventor's prior art publications, H. S.-Y. Hsich, Proc. $34^{th}$ Int. SAMPE Symp., 884 (1989), H. S.-Y. Hsich, J. Mater. Sci., 25, 1569 (1990), H. S.-Y. Hsich, Polym. Eng. Sci., 30, 493 (1990).

An outer layer of polyamide is coextruded around the adhesive layer. The polyamide could be nylon 12, nylon 6, or a sublayer of nylon 6 and a cover layer of nylon 12.

A second embodiment of the present invention is a three-layer tubing assembly for use in liquid fuel-line applications. It includes an extruded inner semi-conductive and permeation-resistant layer of soft ETFE. The ETFE is made semi-conductive by mixing it with 1% to 6% by weight of conductive carbon black. It has a surface resistivity in the range of about $10^2$ to $10^8$ ohm/sq., with a preferential range of $10^3$ to $10^5$ ohm/sq.

An adhesive layer is coextruded around the inner permeation-resistant layer.

The adhesive, as in the first embodiment, is a polymer blend or alloy that has a multi-phase morphology wherein one phase is compatible or miscible with ETFE, and another phase is compatible or miscible with polyamide. An outer layer of polyamide is coextruded around the adhesive layer. The polyamide could be nylon 12, nylon 6, or a sublayer of nylon 6 and a cover layer of nylon 12.

A third embodiment of the present invention is a three-layer tubing assembly for use in vapor fuel-line applications. It includes an extruded inner permeation-resistant layer of soft ETFE. An adhesive layer is coextruded around the inner permeation-resistant layer. The adhesive, as in the first and second embodiments, is a polymer blend or alloy that has a multi-phase morphology wherein one phase is compatible or miscible with ETFE, and another phase is compatible or miscible with polyamide. An outer layer of polyamide is coextruded around the adhesive layer. The polyamide could be nylon 12, nylon 6, or a sublayer of nylon 6 and a cover layer of nylon 12.

While the above embodiments disclose the inner permeation-resistant layer formed of ETFE as the preferred fluoropolymer, it should be noted that bonding other types of fluoropolymer to polyamides are also particularly difficult with the use of an adhesive that has a single phase. Therefore, a polymer blend or alloy that has a multi-phase morphology wherein one phase is compatible or miscible with the fluoropolymer and another phase compatible or miscible with the polyamide, can also be used for bonding an outer layer of polyamide and inner layer of fluoropolymer other than ETFE. Examples of such fluoropolymers other than ETFE include but are not limited to ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylidene, polytetrafluoroethylene, and copolymers, blends and mixtures thereof.

Similarly while the above embodiments described an outer layer of polyamides, other polymers chemically dissimilar from fluoropolymer can be used for forming the outer layer. Such polymers chemically dissimilar from fluoropolymer include but are not limited to polyesters, polyketones, polyofins, and copolymers, blends and mixtures thereof.

The adhesive layer for the above embodiments is coextruded around an inner permeation-resistant layer. The material for forming the adhesive layer is a polymer blend or alloy that has a multi-phase morphology wherein one phase is compatible or miscible with fluoropolymer and another phase is compatible or miscible with polyamides. To obtain sufficient bonding between each phase of the adhesive layer with the adjoining layer, at least 25% volume fraction of one phase is miscible with the polymer for forming one of the adjoining layer and at least 25% volume faction of a second phase is miscible with the polymer for forming the other adjoining layer.

A desirable morphology and mechanical properties of the polymer blends or alloys for forming the adhesive layer can be further improved by blending two or more immiscible polymers with a compatibilizers which will consequently result in improved adhesion strength. Furthermore, during coextrusion process of the multi-layer hose or tubing, the rheological properties of the polymer blends or alloys can be properly modified to allow the material for forming the adhesive layer to obtain proper viscosity and elasticity to achieve the optimal property for extrusion. Such materials for compatibilizers and rheology modifiers include but not limited to organomers, organometallics, organophosphates, silanes, acrylate modified polyolefins, acrylate modified fluoropolymers, acrylate derivative modified polyolefins, acrylate derivative modified fluoropolymers, fluoroelastomers and mixtures thereof. To obtain optimal adhesive strength and proper viscosity and elasticity for extrusion, the polymer blends or alloys having a multi-phase morphology should comprise 0.5% to 20% by weight the compatibilizers and rheology modifiers.

Various features of the present invention have been described with reference to the above embodiments. It should be understood that modifications may be made without departing from the spirit and scope of the invention as represented by the following claims.

What is claimed is:

1. A multi-layer hose comprising:
    an extruded inner permeation-resistant layer of fluoropolymer;
    an adhesive layer co-extruded around said inner layer, said adhesive layer comprised of a polymer alloy having a multi-phase morphology wherein a first phase is miscible with said fluoropolymer and a second phase is miscible with a polymer chemically dissimilar from fluoropolymer; and
    an outer layer of said polymer chemically dissimilar from fluoropolymer coextruded around said adhesive layer;
    wherein said adhesive layer comprises at least 25% volume fraction of said first phase and at least 25% volume fraction of said second phase.

2. A multi-layer tubing assembly as claimed in claim 1 wherein said fluoropolymer for forming said inner layer is selected from the group consisting of ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylidene, polytetrafluoroethye, and copolymers, blends and mixtures thereof.

3. A multi-layer tubing assembly as claimed in claim 1 wherein said polymer chemically dissimilar from fluoropolymer is selected from the group consisting of polyamides, polyesters, polyketones, polylefins, and copolymers, blends and mixtures thereof.

4. A multi-layer tubing assembly as claimed in claim 1 wherein said inner permeation-resistant layer of fluoropolymer is semi-conductive.

5. A multi-layer tubing assembly as claimed in claim 4 wherein said inner layer of permeation-resistant and semi-conductive fluoropolymer has a surface resistivity in the range of about $10^2$ to $10^8$ ohm/sq.

6. A multi-layer tubing assembly as claimed in claim 4 wherein said inner layer of permeation-resistant and semi-conductive fluoropolymer comprises 1% to 10% weight of conductive carbon black.

7. A multi-layer hose comprising:
    an extruded innermost semi-conductive layer of fluoropolymer;
    an inner permeation-resistant layer of fluoropolymer coextruded around said innermost layer;
    an adhesive layer co-extruded around said inner layer, said adhesive layer comprised of a polymer alloy having a multi-phase morphology wherein a first phase is miscible with said fluoropolymer for forming said inner permeation-resistant layer and a second phase is miscible with a polymer chemically dissimilar from fluoropolymer; and
    an outer layer of said polymer chemically dissimilar from fluoropolymer coextruded around said adhesive layer;
    wherein said adhesive layer comprises at least 25% volume fraction of said first phase and at least 25% volume fraction of said second phase.

8. A multi-layer tubing assembly as claimed in claim 7 wherein said fluoropolymer for forming said inner layer is selected from the group consisting of ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylidene, polytetrafluoroethye, and copolymers, blends and mixtures thereof.

9. A multi-layer tubing assembly as claimed in claim 7 wherein said polymer chemically dissimilar from fluoropolymer is selected from the group consisting of polyamides, polyesters, polyketones, polylefins, and copolymers, blends and mixtures thereof.

10. A multi-layer tubing assembly as claimed in claim 7 wherein said innermost layer of semi-conductive fluoropolymer has a surface resistivity in the range of about $10^2$ to $10^8$ ohm/sq.

11. A multi-layer tubing assembly as claimed in claim 7 wherein said innermost layer of semi-conductive fluoropolymer comprises 1% to 10% weight of conductive carbon black.

12. A multi-layer tubing assembly comprising:
    an extruded innermost semi-conductive layer of fluoropolymer;
    an inner permeation-resistant layer of fluoropolymer coextruded around said innermost layer;
    an adhesive layer co-extruded around said inner permeation-resistant layer, said adhesive layer comprised of a polymer alloy having a multi-phase morphology wherein one phase is miscible with said fluoropolymer for forming said inner permeation-resistant layer and another phase miscible with a polymer chemically dissimilar from fluoropolymer; and
    an outer layer of said polymer chemically dissimilar from fluoropolymer coextruded around said adhesive layer;
    wherein said multi-phase polymer comprises 0.5% to 20% by weight compatibilizers and rheology modifiers.

13. A multi-layer tubing assembly as claimed in claim 12 wherein said compatibilizer and rheology modifier is selected from the group consisting of organomers, organometallics, organophosphates, silanes, acrylate modified polyolefins, acrylate modified fluoropolymers, acrylate derivative modified polyolefins, acrylate derivative modified fluoropolymers, fluoroelastomers, and mixtures thereof.

14. A multi-layer tubing assembly as claimed in claim 12 wherein said fluoropolymer is selected from the group consisting of ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylidene, polytetrafluoroethylene, and copolymers, blends and mixtures thereof.

15. A multi-layer tubing assembly as claimed in claim 12 wherein said polymer chemically dissimilar from fluoropolymer is selected from the group consisting of polyamides, polyesters, polyketones, polylefins, and copolymers, blends and mixtures thereof.

16. A multi-layer tubing assembly as claimed in claim 15 wherein said outer layer is formed of nylon 12.

17. A multi-layer tubing assembly as claimed in claim 15 wherein said outer layer comprises a sublayer formed of nylon 6 and a cover layer formed of nylon 12.

18. A multi-layer tubing assembly as claimed in claim 12 wherein said innermost layer of semi-conductive fluoropolymer has a surface resistivity in the range of about $10^2$ to $10^8$ ohm/sq.

19. A multi-layer tubing assembly as claimed in claim 12 wherein said innermost layer of semi-conductive fluoropolymer comprises 1% to 10% weight of conductive carbon black.

20. A multi-layer tubing assembly comprising:
   an extruded inner permeation-resistant layer of fluoropolymer;
   an adhesive layer co-extruded around said inner layer, said adhesive layer comprised of a polymer alloy having a multi-phase morphology wherein one phase is miscible with said fluoropolymer and another phase miscible with a polymer chemically dissimilar from fluoropolymer; and
   an outer layer of said polymer chemically dissimilar from fluoropolymer coextruded around said adhesive layer;
   wherein said multi-phase polymer comprises 0.5% to 20% by weight compatibilizers and rheology modifiers.

21. A multi-layer tubing assembly as claimed in claim 20 wherein said compatibilizer and rheology modifier is selected from the group consisting of organomers, organometallics, organophosphates, silanes, acrylate modified polyolefins, acrylate modified fluoropolymers, acrylate derivative modified polyolefins, acrylate derivative modified fluoropolymers, fluoroelastomers and mixtures thereof.

22. A multi-layer tubing assembly as claimed in claim 20 wherein said fluoropolymer is selected from the group consisting of ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylidene, polytetrafluoroethylene, and copolymers, blends and mixtures thereof.

23. A multi-layer tubing assembly as claimed in claim 20 wherein said polymer chemically dissimilar from fluoroplastic is selected from the group consisting of polyamides, polyesters, polyketones, polyolefins, and copolymers, blends and mixtures thereof.

24. A multi-layer tubing assembly as claimed in claim 20 wherein said inner permeation-resistant layer of fluoropolymer is semi-conductive.

25. A multi-layer tubing assembly as claimed in claim 20 wherein said inner permeation-resistant and semi-conductive layer of fluoropolymer has a surface resistivity in the range of about $10^2$ to $10^8$ ohm/sq.

26. A multi-layer tubing assembly as claimed in claim 20 wherein said inner permeation-resistant and semi-conductive layer of fluoropolymer comprises 1% to 10% weight of conductive carbon black.

* * * * *